(12) United States Patent
Molard et al.

(10) Patent No.: US 8,446,381 B2
(45) Date of Patent: May 21, 2013

(54) CONTROL PANELS FOR ONBOARD INSTRUMENTS

(75) Inventors: Yannick Molard, Hersbach (FR); Laurent Tupinier, Reichstett (FR)

(73) Assignee: Delphi Technologies, Inc., Troy, MI (US)

( * ) Notice: Subject to any disclaimer, the term of this patent is extended or adjusted under 35 U.S.C. 154(b) by 392 days.

(21) Appl. No.: 12/676,175

(22) PCT Filed: Sep. 15, 2008

(86) PCT No.: PCT/FR2008/051651
§ 371 (c)(1),
(2), (4) Date: Apr. 15, 2010

(87) PCT Pub. No.: WO2009/047437
PCT Pub. Date: Apr. 16, 2009

(65) Prior Publication Data
US 2010/0188349 A1 Jul. 29, 2010

(30) Foreign Application Priority Data
Sep. 14, 2007 (EP) ..................................... 07360040

(51) Int. Cl.
*G06F 3/041* (2006.01)
(52) U.S. Cl.
USPC ......... 345/173; 345/175; 345/184; 178/18.03
(58) Field of Classification Search
USPC ....................... 345/156–184, 905; 340/815.4; 178/18.01–18.11
See application file for complete search history.

(56) References Cited

U.S. PATENT DOCUMENTS

| 4,791,252 | A | * | 12/1988 | Mayer | 200/52 R |
|---|---|---|---|---|---|
| 5,598,527 | A | * | 1/1997 | Debrus et al. | 345/173 |
| 6,256,558 | B1 | | 7/2001 | Sugiura et al. | |
| 7,084,859 | B1 | * | 8/2006 | Pryor | 345/173 |
| 7,489,303 | B1 | * | 2/2009 | Pryor | 345/173 |
| D589,421 | S | * | 3/2009 | Tupinier | D12/192 |
| 2005/0064936 | A1 | * | 3/2005 | Pryor | 463/36 |
| 2005/0276448 | A1 | | 12/2005 | Pryor | |
| 2007/0052545 | A1 | * | 3/2007 | Le Gallic | 340/815.4 |
| 2007/0222765 | A1 | * | 9/2007 | Nyyssonen | 345/173 |
| 2008/0088602 | A1 | * | 4/2008 | Hotelling | 345/173 |
| 2008/0129707 | A1 | * | 6/2008 | Pryor | 345/175 |

(Continued)

FOREIGN PATENT DOCUMENTS

| DE | 199 01 896 | 7/1999 |
|---|---|---|
| DE | 103 03 793 | 8/2004 |
| EP | 1 759 912 | 3/2007 |
| WO | 2006/074712 | 7/2006 |

OTHER PUBLICATIONS

International Search Report dated Apr. 22, 2009.

*Primary Examiner* — Dmitriy Bolotin
(74) *Attorney, Agent, or Firm* — J. Gordon Lewis

(57) ABSTRACT

An automotive control/display panel for multiple onboard systems includes a touch-screen for displaying system related information and a peripheral frame defining operator finger guide zones. The touch-screen is selectively reconfigurable to establish virtual display and control buttons on the screen within associated finger guide zones. The information and functionality of the virtual control and display buttons is varied to relate to a particular onboard system as a function of the previous actuation of a virtual selection button. The peripheral frame also defines virtual knobs disposed adjacent the touch-screen.

19 Claims, 2 Drawing Sheets

U.S. PATENT DOCUMENTS

| | | | |
|---|---|---|---|
| 2008/0211779 A1* | 9/2008 | Pryor | 345/173 |
| 2008/0246730 A1* | 10/2008 | Simons | 345/164 |
| 2009/0267921 A1* | 10/2009 | Pryor | 345/177 |
| 2009/0273563 A1* | 11/2009 | Pryor | 345/157 |
| 2009/0273574 A1* | 11/2009 | Pryor | 345/173 |
| 2009/0273575 A1* | 11/2009 | Pryor | 345/173 |

* cited by examiner

CONTROL PANELS FOR ONBOARD INSTRUMENTS

TECHNICAL FIELD

The present invention relates to a control panel for onboard instruments of vehicles, in particular intended to be used in the motor vehicle field.

It permits the simplified and optimised implementation of a plurality of groups of distinct functionalities.

BACKGROUND OF THE INVENTION

The successive technological advances applied to the motor vehicle increase the control options of an increasing number of settings for the driver of the vehicle, or even its other occupants. Now, the possibility of monitoring or controlling a function or a group of functions generally involves display of their instantaneous state. This constant and large increase in the modulation options offered to users also reflects progressively advanced automation of vehicles and an increased convenience requirement. It simultaneously leads to a space management and treatment problem, in particular to locate and judiciously use the control, selection and adjustment organs, display screens, etc.

The locations useable and already used to embed the said organs are at the level or the steering-wheel, in the spaces between the seats of the driver and the front passenger, at the door armrests, under the steering wheel and, of course, on the dashboard.

However, with the number of possibilities for control/selection/display continuing to increase, it is not only a question of finding new spaces in which to located them, but also of attempting to gather them together in groups, or even increase their density in the places already used, without thereby damaging their operational ergonomics.

A solution currently employed to improve compactness of the control/monitoring zones resides in the use of screens, the image conveying an unequalled density of information. However, even under this hypothesis, it is scarcely possible any longer to have recourse to the type of solution which has been prevalent up to now, namely introducing more and more monitoring screens into motor vehicles, each dedicated to a group of particular functions (air-conditioning, navigation, audio or telephony system, etc.). Not only does the user then have, certainly unconsciously, to simultaneously select within the passenger space of his vehicle the functions to be activated and the location of the corresponding control organs, the increase in the number of the screens brings back the initial problem.

SUMMARY OF THE INVENTION

It has therefore been proposed to have recourse to screens provided with virtual control organs which change depending on what is displayed on the screen, in order to monitor distinct functions or groups of functions which then appear sequentially in the manner of menus and sub-menus. The different menus are selected directly on the screen, and not using external means.

One of the advantages of this type of solution results from the synergetic effect arising from the possible multiplicity of the monitoring/display devices and from the grouping in the same location of the functionalities which they represent. The selection buttons allow the monitoring panel for each function group to be visually remodelled, the different monitoring panels selected obeying, however, a logic of embedment of the control buttons which proceeds as far as possible from a unified model. The use of the monitoring panel is so facilitated by being made more intuitive.

Such a solution is for example described in the document DE 103 03 793, which discloses a system based on a screen at the periphery of which are situated zones defining virtual control buttons. The sequential screen changes, where necessary accompanied by modification of the virtual control/monitoring organs, do however paradoxically require more sustained attention on the part of the users, due to the high concentration of control devices applied to functions or groups of functions which are very varied but available in a single location.

The use of virtual buttons alone is not sufficient to guarantee smooth operation which is easy to integrate and of a nature to improve overall driving safety. In fact it is not sufficient to group a maximum number of functions in the same location, they must also be organised intuitively with a form of automation of behaviour allowing safety to really be ensured. This is the aim of the invention.

This is intended to facilitate the use of the said virtual organs by organising outside the screen means which continuously provide users with information as to the nature of the operations to be carried out to control the said organs, regardless of the image appearing on the screen, as well as practical, immediately intelligible assistance in performing these operations and a degree of automation of a nature to give rise to reactions interfering with the driver's concentration as little as possible.

To these ends, the invention including in known manner:
- a touch screen for displaying information;
- a frame defining the periphery of the said screen and including finger guiding zones;
- virtual selection and control buttons displayed on the screen at least in the said guiding zones;

is characterised principally by the fact that the frame includes one or more orifices completely surrounded by the frame, the edges of each orifice defining a shape:
- forming for at least one finger a path corresponding to the mode of actuation of the virtual control button appearing there;
- the geometry of which informs the user of the movement to be performed in order to actuate the virtual button which it defines;
- the internal edge of which is calculated to guide the finger or fingers in its/their displacement.

Thus, the buttons are not only perfectly located, but they also include means providing on the one hand an informative function as to the nature of the movement to be undertaken and on the other guiding which allow the user to make use of them under optimum conditions, i.e. without requiring particular concentration. In practice, this means that the shape of the orifice recreates that of a real button in general with graduated operation, the guiding allowing the same movement to be performed on the virtual button as that which would have been applied to its real equivalent.

In accordance with one possible configuration, these orifices are round and define virtual rotary control knobs. In this case, preferably, an annular peripheral zone of the knob surrounds a central zone occupied by a virtual push button.

These knobs obey same operational logics which facilitate the work of the user in that he always employs this standardised logic, which provides a sort of intellectual automation of operation. Taking this logic to its extreme, the very positioning of the knobs can reflect different logics.

Thus, the annular zone of at least one of the virtual knobs can scan sequentially and in a loop a succession of actions appearing on the screen, the central zone validating the action on which the knob its situated when it is actuated (for example the choice of radio stations). Alternatively, the annular zone of at least one of the virtual knobs (19, 20, 21) can vary a single parameter (for example sound), the central zone activating or deactivating the said parameter.

In accordance with the invention, knobs presenting the two different operational logics as described above are always in the same locations within the frame of the screen. In other words, depending on their location within the frame, the virtual knobs always obey the same operational logic.

Alternatively, the said orifices can be elongate and rectilinear and define virtual control cursors.

Thus, in all cases, the rigid boundary provided by the frame permits accompaniment to the displacement of the fingers, depending on the type of movement which they have to perform in relation to the virtual button. In the case of knobs, adjustment is effected by rotation of the finger inside the guiding zone, which rotation is guided by the circular peripheral boundary. In fact, it is sufficient for the user to follow the circular frame from the inside with his finger in one direction or the other to adjust the function controlled by this adjustment/control button.

Preferably, at least certain of the virtual buttons appearing on the screen co-operate with a haptic device providing a tactile sensation to the finger in response to activation of the button. This can apply both to the control buttons and to the selection buttons.

In accordance with one possibility, each haptic device providing a tactile response is based on a vibrating electromagnet.

The tactile response, which can be modulated by control of the electromagnet, substantially increases convenience and safety for the user of such a screen as it removes the need to look at it. Thus, if the finger of the user activating a virtual push-button is subjected to a tactile sensation imitating the passing of a point of resistance, he will know that his operation has been taken into account. Similarly, a high-frequency periodic vibratile response imitating passage over multiple notches for a knob will indicate to him that his operation intended to turn the said knob has indeed been taken into account and the "virtual" rotary movement is being effected.

Preferably, the lateral sides of the frame which define the periphery of the screen are provided with orifices at least partially surrounding representations on the screen of virtual selection buttons.

Also preferably, these orifices include tabs for location and for guiding the fingers.

The function of these tabs is not as complete as that of the totally enclosed orifices of the frame, but it approaches it: facilitating access to certain virtual buttons of the screen, typically those which do not require guiding resulting from a displacement modelling a control graduation. These are, for example, virtual buttons of the push button type, only permitting an on/off control.

In accordance with one possibility, the control panel of the invention includes an infra-red position detector permitting detection of whether activation of the virtual buttons comes from its left or its right.

This control is intended to improve the user-friendliness of the vehicle, by translating the provenance of the control operation into differentiated response effects. Thus, if the driver or user brings his finger near in order to perform a control operation pertaining to the functionalities linked to climate-control, for example a variation in the air flow in the vehicle or in the temperature, the said variation will preferentially be implemented on the side from which the modification request emanates.

More generally, the volume of the invention can include an infra-red position detector permitting precise location of the activation zone by X, Y co-ordinates in a plane, in order to preselect a particular function to be confirmed. Such a function permits further improvement in the user convenience of the invention and thus optimisation of its ergonomics.

Moreover, the frame of the control panel of the invention can include mechanical buttons for critical or priority functions.

This involves a sort of privileged mechanical access to the most critical functions, i.e. those to find which it is not considered judicious or even considered inadvisable to have to pass through the different menus. This applies for example to:
the hazard warning lights;
the sound volume;
bluetooth activation;
remote control of functions linked to dwelling places (opening of the garage/door);
demisting;
temperature adjustment;
interior recycling of air in case of exterior pollution.

In all cases, the implementation of these different functions may require a certain rapidity of reaction which is scarcely compatible with seeking the suitable menu on the screen and then controlling the function.

The single multiple task control panel which is the main characteristic of the invention permits implementation of many groups of functionalities, available at choice or dependent of the range of the vehicle, for example. By way of example, the selection buttons may apply to:
telephony;
adjusting vehicle components;
navigation;
audio functions;
climate control.

Each of these selection buttons causes the appearance of a particular screen, including specific information relating to these functions and giving access to a menu in the form of virtual control buttons which adjust the settings of the functions selected by the virtual selection buttons.

In other words, the control panel of the invention permits sequential display of "graphic menus" dedicated to each function.

These and other features and advantages of this invention will become apparent upon reading the following specification, which, along with the drawings, describes a preferred embodiment of the invention in detail.

BRIEF DESCRIPTION OF THE DRAWINGS

The invention will now be described in more detail, with reference to the attached figures, in which.

Although the drawings represent one of many possible embodiments and features of the present invention, the drawings are not necessarily to scale and certain features may be exaggerated in order to illustrate and explain the present invention. The exemplification set forth herein illustrates several aspects of the invention, in one form, and such exemplification is not to be construed as limiting the scope of the invention in any manner.

DESCRIPTION OF THE EMBODIMENT OF THE INVENTION

Figure 1:
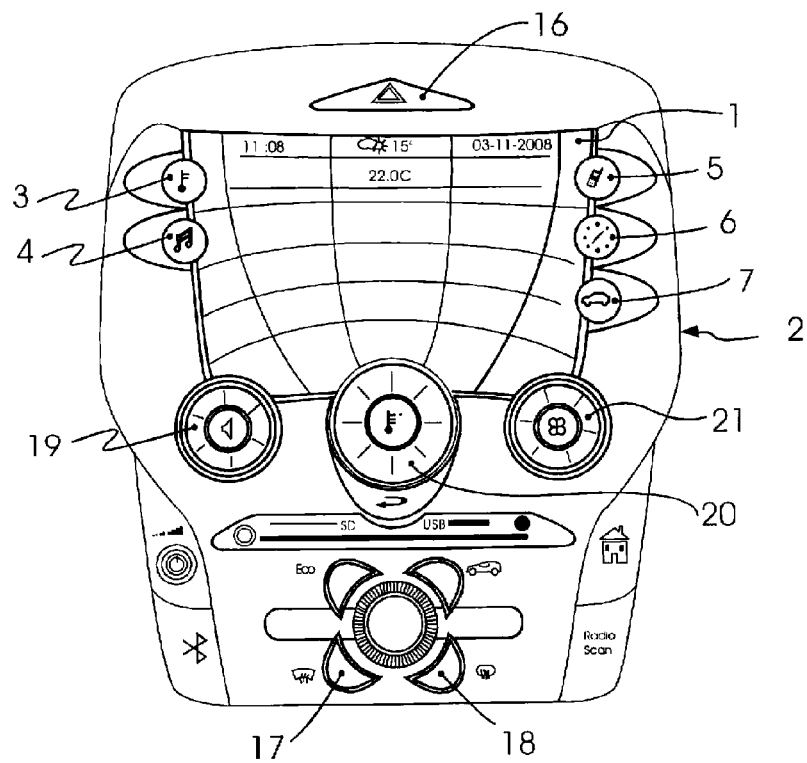
FIG. 1, shows a front elevation of a control panel for onboard instruments in accordance with the invention.
Figure 2:
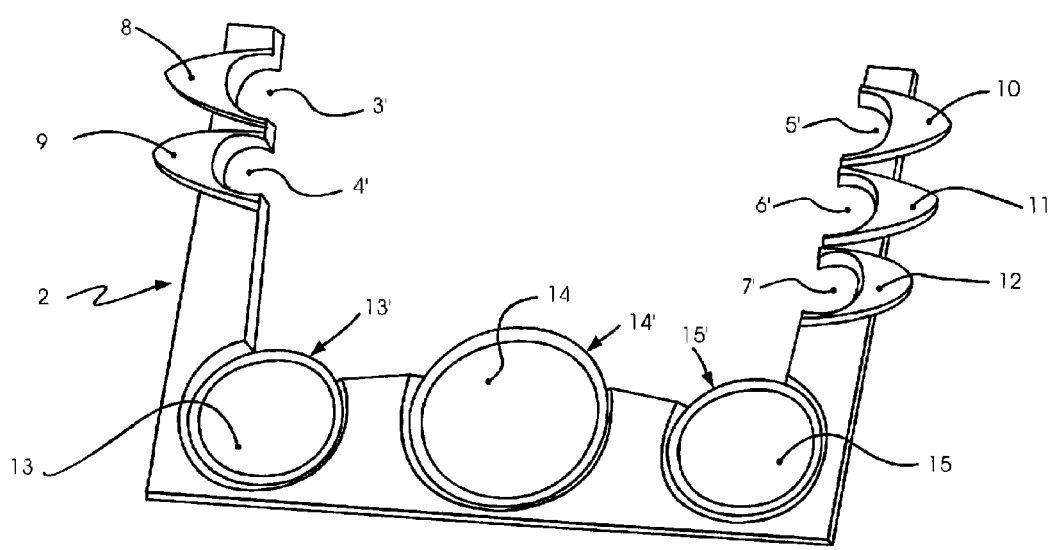
FIG. 2, shows the upper portion of the frame surrounding the screen.

With reference to FIG. 1, the control panel for onboard instruments of a vehicle in accordance with the invention is principally composed of a central screen (1) defined by a frame, bezel or escutcheon (2), and which displays information corresponding to groups of functions selected by means of virtual buttons, i.e. appearing on the screen (1). These buttons, in this case five in number (3, 4, 5, 6, 7) are defined by semi-circular orifices (3') to (7') (see FIG. 2) situated on the lateral sides of the frame (2). Tabs (8, 9, 10, 11, 12) allow the user's finger to be guided towards the virtual buttons (3, 4, 5, 6, 7) so as to facilitate the convenience of the user of the panel and allow the user to only give attention requiring minimal concentration to the operation which he is performing, for reasons of safety.

The lower part of the frame is occupied by other orifices, also circular (13, 14, 15), but the whole of the peripheries of which are surrounded by the frame (2) or portions external to this. Thus, arcs (13', 14', 15') integral with the frame (2) permit the total enclosure of the above-mentioned orifices (13, 14, 15) within a rigid boundary, for reasons which will be explained in more detail below.

The upper part of the frame (2) includes a conventional mechanical button (16) activating the hazard warning lights and, in the lower part, mechanical buttons for immediate access to priority functions, for example for demisting of the windscreen (17) and the rear window (18). The orifices (13, 14, 15) are occupied by virtual control buttons (19, 20, 21) which permit adjustment of settings, in this case by means of virtual knobs. These knobs, and where necessary the buttons (3) to (7), are provided with a haptic device which permits a tactile return of information when they are activated. The circular boundary is obviously to guide the finger of a user activating a knob, even a virtual one.

This complete boundary gives immediate information to the user: the control of the virtual button which it encloses must be rotary, the said rigid boundary then providing a continuous rest guiding the finger during actuation of the button.

Figure 3:
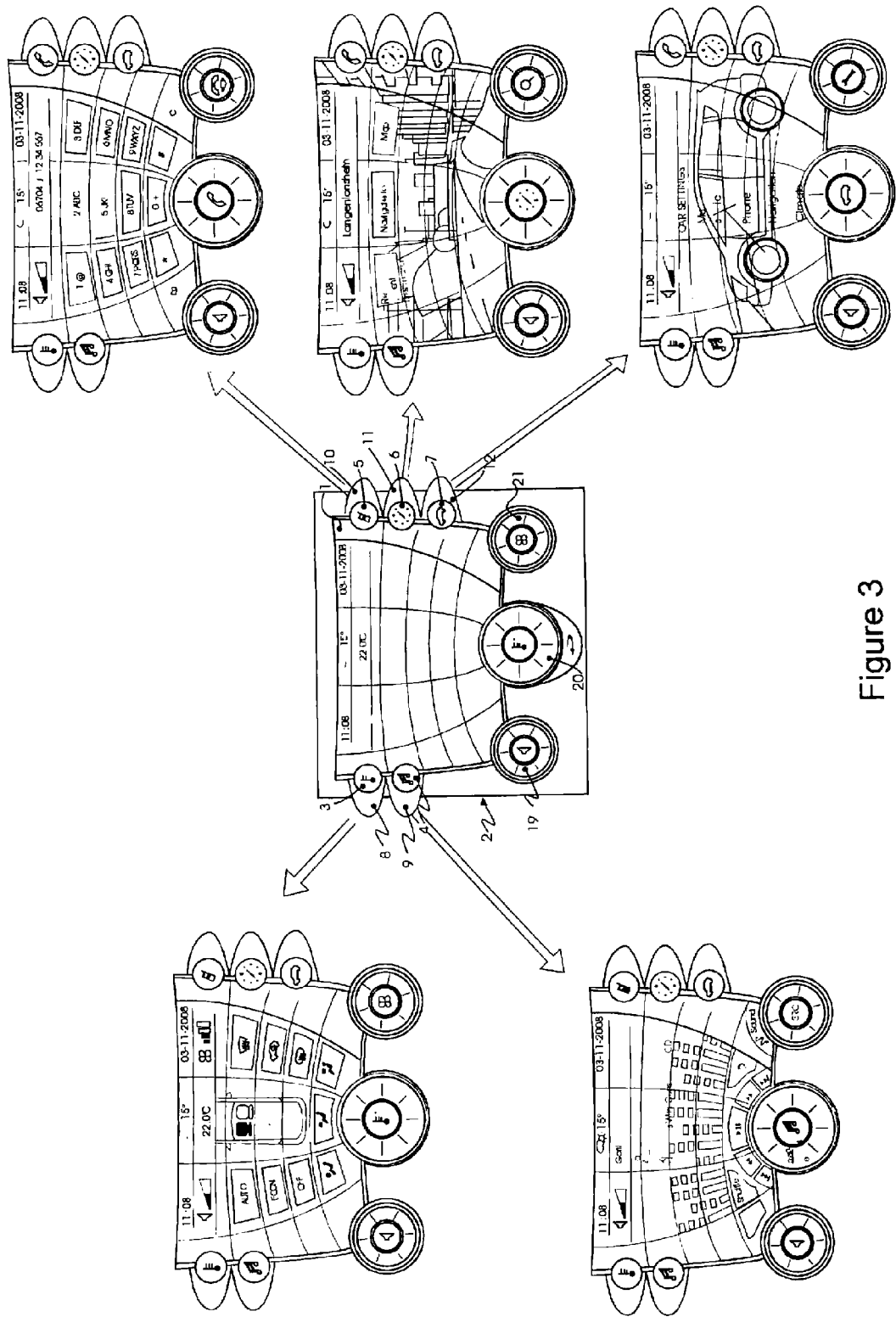
FIG. 3, shows the screen provided with the frame of the preceding figure, and the screen displays corresponding to different functions accessible through the selection buttons.

FIG. 3 shows that whatever the selection made using buttons (3) to (7), the representation logic follows substantially the same schema: knobs appear in all cases at the bottom of the screen, in orifices (13) to (15). These knobs permit monitoring/adjustment of different functions depending on the screen which appears in response to the activation of a selection button (3, 4, 5, 6, 7). The button (3) corresponds to the functionalities linked to climate control. Pressure on this virtual button (3) causes appearance of the screen shown at the top left of FIG. 3. Under this hypothesis, a graphic representation of the vehicle seen from above appears in the centre of the screen, surrounded by virtual buttons for conventional adjustments, of the ventilation, demisting, air recycling, etc. type. In this case, the knobs are used to vary the temperature, power of the air flow, etc.

The screen shown at the bottom left contains the audio functions, i.e. management of a CD player, a radio tuner, etc. The knobs are then used for example to search for stations, vary the sound level, etc.

The screen appearing at the top right contains the functionalities linked to telephony and the screen (1) consequently causes the appearance of a telephone keypad provided with virtual keys. The knobs are used for example to scroll through stored telephone number, to vary the sound level, etc.

The screen shown in the middle on the right contains the navigation functionalities, with knobs permitting variation of the image dimensions, of the sound level, etc.

Lastly, the screen which is shown at the bottom on the right includes the functions linked to certain components of the vehicle: adjusting the orientation of the front headlights, adjusting the position of the steering wheel, etc.

It should be noted that the graphic representations which appear on the different screens and on the virtual buttons permit intuitive and user-friendly management of the panel of the invention. Where appropriate, different colour renderings permit arrangement on the screen (1) of visual feedback of information for the user. Animations can also be employed, always for informative purposes. When the vehicle is started, an introductory animation, appearing by default, is launched. In standby mode, an image appears in the background on the screen moving on the screen to display a certain dynamic of the assembly.

There may be a screen for management and selection of the different FM radio wavelengths. Of course, a part of the screen is always occupied by information of a general order, which is preserved despite the screen changes: date, hour, exterior temperature, etc.

Besides the virtual controls positioned at the periphery of the screen within the physical frame thus defined, direct access may be had in the main zone of the screen to the controls of the displayed menu. Taking the example of the radio stations which are displayed at the centre of the screen, by pressing on these, the selected station is activated and a tactile force feedback is received from the screen zone thus activated.

As indicated above within the framework of the invention, the left knob (19) always functions according to the same logic: the annular zone permits variation of the parameter, the central zone permitting activation or deactivation of it. To further improve ease of use by using intellectual automations as much as possible, this virtual button also still fulfils the same functions, whatever the functional "colour" of the screen, moreover: the annular zone permits variation of the power of the sound, while the central button mutes or reactivates the said sound.

The central knob (20), for its part, always obeys an operational logic in accordance with which the annular zone scans possible actions, like selecting a radio frequency or an interior temperature, the central button permitting validation of the selection. The knob (20) never functions with the logic of knob (19), and vice-versa, which greatly facilitates the task of the driver.

In accordance with the invention, management of the different buttons is therefore optimised so that the nature of the controls (knobs) is suggested by the shape of the screen, and the precise operations depend on the position of the virtual button in the screen (2), which makes operation both intuitive and automatic, with a very easy learning curve.

The invention is obviously not limited to the above-mentioned examples, but encompasses other functions, variable adjustment settings, etc., employed in motor or other vehicles.

The invention claimed is:

1. A control panel for onboard instruments of vehicles, comprising:
   a touch-screen for displaying information;
   a frame defining the periphery of the said screen and including finger guiding zones disposed on said periphery; and virtual selection and control buttons displayed on the screen at least partially in the said finger guiding zones;
wherein the frame includes one or more orifices, each orifice forming one of said finger guiding zones for a virtual control button, and each orifice being completely surrounded by the frame, with internal edges of each orifice defining a shape:
forming for at least one finger a path corresponding to the mode of actuation of the virtual control button appearing there;
the geometry of which informs the user as to the movement to be performed in order to actuate the virtual button which it defines; and
the internal edge of which is calculated to guide the finger or fingers in its/their movement on the touch screen.

2. The control panel of claim 1, wherein said orifices are round and define virtual rotary control knobs.

3. The control panel claim 2, wherein said virtual rotary control knobs each comprise a concentric outer annular peripheral zone and an inner central zone occupied by a virtual push button.

4. The control panel of claim 3, wherein the annular zone of at least one of the virtual knobs scans sequentially and in a loop a succession of actions appearing on the screen, the corresponding central zone validating the action on which the knob is situated at the moment of its actuation.

5. The control panel of claim 4, wherein the annular zone of at least one of the virtual knobs varies a single parameter, the corresponding central zone selectively activating or deactivating the said parameter.

6. The control panel of claim 4, wherein each said virtual knob affects a fixed operational logic as a function of its position within the frame.

7. The control panel of claim 1, wherein said orifices are elongate and generally rectilinear, defining virtual control cursors.

8. The control panel of claim 1, wherein at least certain of the virtual buttons appearing on the screen co-operate with a haptic device providing a tactile sensation to the finger in response to actuation of the button.

9. The control panel of claim 8, wherein said haptic device comprises a vibrating electromagnet.

10. The control panel of claim 1, wherein lateral sides defined by the frame define orifices at least partially surrounding representations on the screen of virtual selection buttons.

11. The control panel of claim 10, wherein said frame includes tabs disposed adjacent associated orifices for location and for guiding of the fingers.

12. The control panel of claim 1, further comprising an infra-red position detector operative to detect whether the activation of the virtual buttons comes from the left or the right.

13. The control panel of claim 1, further comprising an infra-red position detector affecting precise location of the activation zone using X, Y co-ordinates in a plane, to confirm pre-selection of a particular function.

14. The control panel of claim 1, wherein the frame includes mechanical buttons employed for emergency or priority functions.

15. The control panel of claim 14, wherein said priority functions include one or more of:

the hazard warning lights;
the sound volume;
bluetooth activation;
demisting;
temperature control;
interior recycling of air in case of exterior pollution;
remote control of functions linked to dwelling places.

16. The control panel of claim 1, wherein the virtual selection buttons are applied to one or more of:
telephony;
control of components of the vehicle;
navigation;
audio functions;
air conditioning.

17. The control panel of claim 1, wherein the virtual control buttons adjust the parameters of the functions selected by the virtual selection buttons.

18. The control panel for onboard vehicle systems comprising:
a touch-screen operable for receiving vehicle operator inputs and selectively displaying information pertaining to the status of a plurality of vehicle systems;
an escutcheon defining the periphery of the said screen and including a plurality of finger guiding zones disposed on said periphery; and
a plurality virtual selection and virtual control buttons displayed on the screen, each said button being at least partially encompassed by one of said guiding zones,
wherein the escutcheon defines one or more orifices, each orifice forming one of said finger guiding zones for a virtual control button, and each orifice being completely surrounded by the escutcheon, with internal edges of each orifice defining a characteristic shape, said orifice edge:
forming for at least one finger path corresponding to the mode of actuation of the virtual control button appearing there-adjacent;
having a geometry which is suggestive to the operator as to the movement to be performed in order to actuate the virtual button which it defines; and
having an internal edge which defines a surface configured to guide the operator's finger in effecting said input.

19. A vehicular control panel for onboard systems comprising:
a touch-screen operable for receiving tactile operator inputs and selectively displaying information pertaining to a status of at least one vehicle system; and
an escutcheon defining the periphery of the said touch screen and forming a plurality of finger guiding zones, each said zone being contoured to at least partially encompass an associated virtual selection and/or control button displayed on the screen,
said escutcheon defining at least one orifice being completely surrounded by an internal guide edge formed by the escutcheon, the guide edge of said orifice defining a characteristic geometric shape, thereby forming a finger guide path corresponding to a mode of actuation of an associated virtual control button appearing there-adjacent on said touch-screen which is suggestive to an operator as to a movement to be performed in order to actuate the virtual button.

* * * * *